US009852863B2

(12) United States Patent
Schwarz et al.

(10) Patent No.: US 9,852,863 B2
(45) Date of Patent: Dec. 26, 2017

(54) SAFETY SWITCH FOR MONITORING AN ACCESS OF AN AUTOMATION SYSTEM COMPRISING A STATIONARY PART AND A MOVABLE PART

(71) Applicant: SICK AG, Waldkirch (DE)

(72) Inventors: Adrian Schwarz, Waldkirch (DE); Omar Saycon, Admirax (SG); Tun Tun Lin, Admirax (SG)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 15/284,628

(22) Filed: Oct. 4, 2016

(65) Prior Publication Data

US 2017/0098518 A1    Apr. 6, 2017

(30) Foreign Application Priority Data

Oct. 5, 2015    (DE) .................. 10 2015 116 898

(51) Int. Cl.
| | |
|---|---|
| *E05C 19/16* | (2006.01) |
| *H01H 50/04* | (2006.01) |
| *H01H 51/01* | (2006.01) |
| *H01F 7/02* | (2006.01) |

(52) U.S. Cl.
CPC ............ *H01H 50/04* (2013.01); *E05C 19/16* (2013.01); *H01F 7/0273* (2013.01); *H01H 51/01* (2013.01)

(58) Field of Classification Search
CPC ................... E05C 19/16–19/168; E05B 17/56
USPC ....................................................... 292/251.5
See application file for complete search history.

(56) References Cited

U.S. PATENT DOCUMENTS

| | | | |
|---|---|---|---|
| 2010/0218569 A1 | 9/2010 | Hunt et al. | |
| 2013/0049382 A1 | 2/2013 | Day et al. | |

FOREIGN PATENT DOCUMENTS

| | | |
|---|---|---|
| DE | 9304400 A1 | 5/1993 |
| DE | 19503863 A1 | 8/1995 |
| EP | 2871402 A1 | 5/2015 |

OTHER PUBLICATIONS

Office action issued in corresponding German application No. 10 2015 116 898.7 dated Jun. 6, 2016.
European search report dated Feb. 22, 2017 for corresponding EP application 16181792.9.

*Primary Examiner* — Ramon M Barrera
(74) *Attorney, Agent, or Firm* — Nath, Goldberg & Meyer; Jerald L. Meyer

(57) ABSTRACT

A safety switch for monitoring an access of an automation system includes a stationary part and a movable part. The safety switch has a first housing part having an elongate shape and a second housing part having a shape form-fitted with respect to the first housing part. The first housing part and the second housing part each have magnets. The first housing part is arranged in a fixed position in the stationary part of the access and the second housing part is arranged in the movable part of the access such that the magnetic elements are located opposite one another in a closed state of the access, the magnetic elements are magnetically effective together with one another, and a magnetic retaining force can be measured. The first housing part has a signal receiver and an evaluation unit and the second housing part has a signal transmitter, or vice versa.

7 Claims, 1 Drawing Sheet

Figure 1:
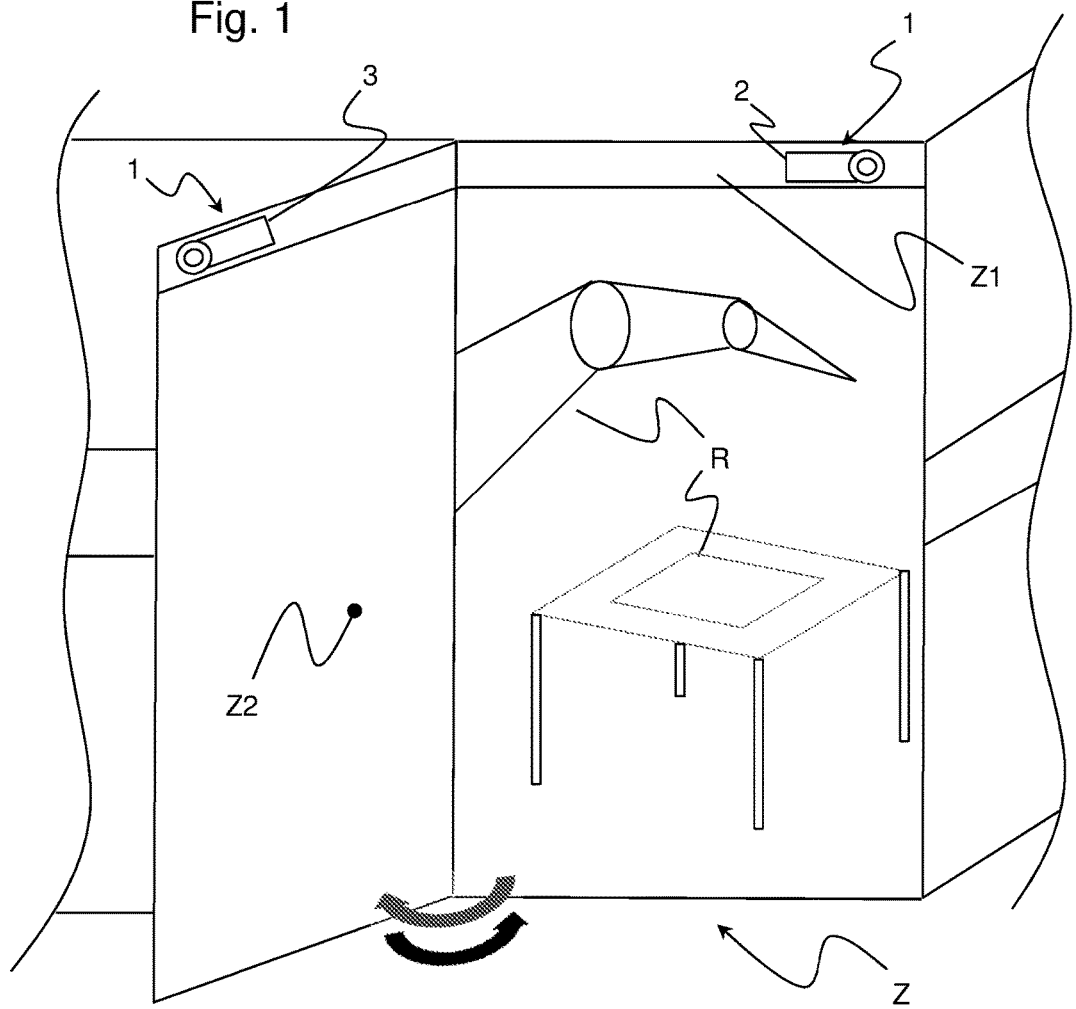

SAFETY SWITCH FOR MONITORING AN ACCESS OF AN AUTOMATION SYSTEM COMPRISING A STATIONARY PART AND A MOVABLE PART

The present invention relates to a safety switch for monitoring an access of an automation system comprising a stationary part and a movable part.

Conventional accesses which comprise the stationary part such as a machine frame, door framework, door frame, machine plate or holding bracket and the movable part such as doors, flaps or hoods, and which together ensure a safe access to the automation system have to be monitored by safety switches with respect to their state, open or closed.

Such a monitoring is implemented, on the one hand, by electromechanical safety switches or, on the other hand, by contactless safety switches. There is the demand in this respect of a safe position monitoring of the movable part with respect to the stationary part of the access and, optionally, of detecting a holding closed of the two parts and to communicate it to a higher-ranking programmable logic controller PLC. The safety switches used for this purpose comprise a sensor part which is mounted in a fixed position to the stationary part of the access and a transmitter part which is mounted to the movable part of the access. When the access is closed, the transmitter part is located directly opposite the sensor part such that the sensor part can detect a signal of the transmitter part and can optionally communicate it as a release signal to the PLC so that the automation system can start.

In the open state of the access, the transmitter part is located spaced apart from the sensor part such that the sensor part cannot detect any signal and can also not communicate any release signal to the PLC. The automation system is thereby not released for operation or, if the automation system is already in operation, is moved into a safe state.

Large projecting edges result in the region of the access due to the installation of the sensor part and the transmitter part at the parts of the access. There is furthermore the risk of a manipulation of the safety switch by attaching a single transmitter not installed at the movable part of the access to the sensor part such that a closed state of the access is simulated.

It is an object of the present invention to improve a safety switch for monitoring an access of an automation system comprising a stationary part and a movable part such that the above disadvantages of the known safety switch are avoided.

The object is satisfied in accordance with the invention by a safety switch for monitoring an access of an automation system comprising a stationary part and a movable part, wherein the safety switch has a first housing part having an elongate, preferably parallelepiped, shape and a second housing part having a shape form-fitted with respect to the first housing part; the first housing part has a first magnetic element and the second housing part has a second magnetic element; the first housing part is arranged in a fixed position in the stationary part of the access and the second housing part is arranged in the movable part of the access such that the magnetic elements are located opposite one another in a closed state of the access, such that the magnetic elements are magnetically effective together with one another, and such that a magnetic retaining force can be measured; wherein the first housing part has a signal receiver and an evaluation unit and the second housing part has a signal transmitter, or vice versa; and the first magnetic element or the second magnetic element is provided at a first end of the elongate shape of the first or second housing part and the signal receiver or the signal transmitter is provided at a second end of the elongate shape of the first or second housing part; and wherein the first and second housing parts are arranged in the stationary and movable parts of the access such that a longitudinal axis of the first and second housing parts are located in a horizontal position.

In accordance with a preferred embodiment, the first magnetic element comprises an electromagnet, a permanent magnet or a magnetic armature. The second magnetic element furthermore advantageously comprises a magnetic armature, an electromagnet or a permanent magnet.

In accordance with a further preferred embodiment, the signal transmitter is arranged disposed opposite the signal receiver in the closed state of the access and the evaluation unit receives a signal in this closed position.

In accordance with a further preferred embodiment, the signal transmitter is spaced apart from the signal receiver in an open state of the access and the evaluation unit does not receive any signal in this open position so that the automation system can be brought into a safe state.

In accordance with a further preferred embodiment, the magnetic holding force of the magnetic elements is smaller than a torque of the elongate first housing part or second housing part which is formed from a weight force at the second end of the first or second housing parts having the signal receiver and the evaluation unit or the signal transmitter and a lever arm from a spacing between the second end of the first or second housing parts from the first end of the first or second housing parts having the respective magnetic elements.

Preferred embodiments and further developments as well as further advantages of the invention can be seen from the dependent claims, from the following description and from the drawings.

The invention will be explained in detail in the following with reference to embodiments and to the drawings. There are shown in the drawings:

FIG. 1 a schematic representation of an access of an automation system; and

Figure 2:
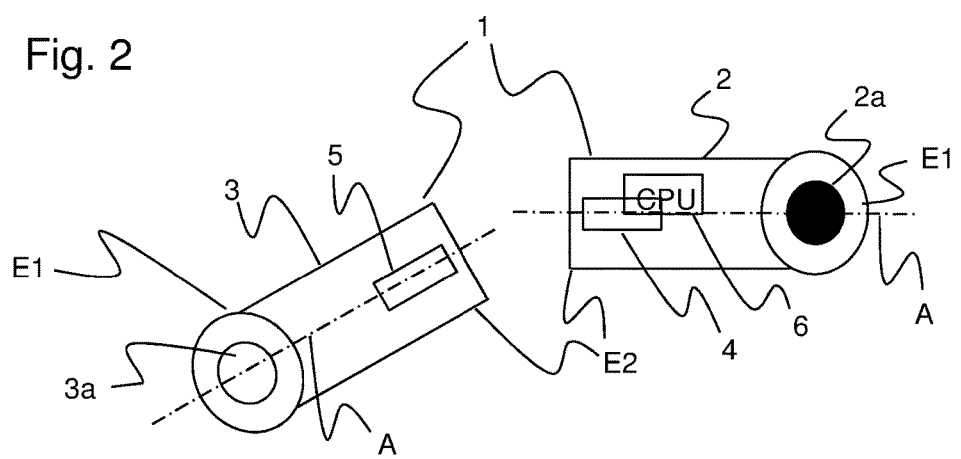

FIG. 2 a large schematic view of a safety switch in accordance with the invention.

An access Z to an automation system R is shown schematically in FIG. 1 which comprises a stationary part Z1 in the form of a wall or of a protective fence and a movable part Z2 in the form of a door. The access Z serves to prevent an access of a person to the automation system R during an operation or to bring the automation system R into a safe state with respect to the person. The stationary and movable parts Z1 and Z2 of the access Z each have a finitely wide frame in which a respective housing part 2 and 3 of a safety switch 1 in accordance with the invention is installed, wherein the safety switch 1 in accordance with the invention is provided to monitor a closed state or an open state of the access Z.

In this respect, the safety switch 1 in accordance with the invention is able to detect whether the access Z is open, i.e. the movable part Z2 of the access Z is spaced apart from the stationary part Z1 of the access Z, or closed, i.e. the movable part Z2 of the access Z is arranged directly opposite the stationary part Z1 of the access Z.

The safety switch 1 has first and second housing parts 2 and 3, wherein the first and second housing parts 2 and 3 are each provided with an elongate, preferably parallelepiped, shape. The first and second housing parts 2 and 3 are formed in a form-fitted manner with respect to one another.

The first housing part 2 of the safety switch 1 is installed in the frame of the stationary part Z1 of the access Z and the second housing part 3 of the safety switch 1 is installed in the frame of the movable part Z2 of the access Z. The safety switch 1 or the housing parts 2 and 3 of the safety switch 1 hereby do not form any projecting contour at the access Z since the safety switch 1 or the housing parts 2 and 3 of the safety switch 1 is/are so-to-say arranged integrated into the frame of the access Z.

FIG. 2 represents a large schematic view of the safety switch 1 in accordance with the invention in detail, with the first and second housing parts 2 and 3 being shown directly next to one another for better understanding.

The first housing part 2 has a first magnetic element 2a at a first end E1 of the elongate shape, with the first magnetic element 2a preferably comprising an electromagnet, a permanent magnet or a magnetic armature. The first housing part 2 has a signal receiver 4 and an evaluation unit 6 at a second end E2 of the elongate shape.

The second housing part 3 has a second magnetic element 3a at a first end E1 of the elongate shape, with the second magnetic element 3a preferably comprising an electromagnet, a permanent magnet or a magnetic armature. The second housing part 3 has a signal transmitter 5 at a second end E2 of the elongate shape.

In this respect, an association of the mentioned elements, magnetic elements 2a and 3a, signal receivers 4, evaluation unit 6 and signal transmitters 5, with the first and second housing parts 2 and 3 is in this respect also possible vice versa. I.e. the first housing part 2 has the signal transmitter 5 and the second housing part 3 has the signal receiver 4 and the evaluation unit 6.

The second magnetic element 3a of the second housing part 3 in particular comprises the magnetic armature when the first magnetic element 2a of the first housing part 2 comprises the electromagnet or the permanent magnet, or vice versa.

The first and second magnetic elements 2a and 3a are located opposite one another in a closed state of the access Z. The first and second magnetic elements 2a and 3a are thereby magnetically effective together and a magnetic retaining force can be measured which holds the movable part Z2 of the access Z fixed to the stationary part Z1 of the access Z. The signal receiver 4 receives a signal of the signal transmitter 5 in the closed state of the access Z so that the evaluation unit 6 communicates a signal which represents the closed state of the access Z to a higher-ranking programmable logic controller PLC. The PLC can inter alia release the operation of the automation system R on the basis of the signal of the evaluation unit 6.

The safety switch 1 can advantageously have this function of the PLC, i.e. the evaluation unit 6 of the safety switch 1 releases the operation of the automation system R when the access Z is closed or guides the automation system R into a safe state when the access Z is open or opening.

The first and second housing parts 2 and 3 of the safety switch 1 each have a longitudinal axis A which extends along the elongate shape of the first or second housing parts 2 and 3 respectively.

In this respect, the first and second housing parts 2 and 3 are arranged in accordance with the invention in the stationary and movable parts Z1 and Z2 of the access Z such that the longitudinal axis A of the first and second housing parts 2 and 3 are in a horizontal position. I.e. the elongate shape of the first and second housing parts 2 and 3 are each installed horizontally in the frame of the access Z.

A respect weight force engages at both first and second ends E1 and E2 of the first and second housing parts 2 and 3 due to the horizontal arrangement of the first and second housing parts 2 and 3 of the safety switch 1. The weight force is compensated by the frame of the access Z.

The magnetic holding force of the first and second magnetic elements 2a and 3a is advantageously smaller than a torque of the elongate first and second housing parts 2 and 3, with the torque being formed from the weight force at the second end E2 of the first or second housing parts 2 or 3 respectively having the signal receiver 4 and the evaluation unit 6 or having the signal transmitter 5 and a lever arm from a spacing between the second end E2 of the first or second housing parts 2 or 3 from the first end E1 of the first or second housing parts 2 or 3 respectively having the respective magnetic element 2a or 3a respectively.

I.e. the housing parts 2 and 3 are held at one another by the magnetic holding force of the first and second magnetic elements 2a and 3a at the first end E1 of the first and second housing parts 2 and 3 of the safety switch 1. The torque acts at the second end E2 of the first and second housing parts 2 and 3 of the safety switch 1 on the basis of the horizontal attachment of the first and second housing parts 2 and 3 into the frame of the access Z. This torque is compensated by the frame of the access.

If the housing part 3 or 2 of the safety switch 1 provided for the movable part Z2 of the access Z is attached only, i.e. without being installed in the movable part Z2 of the access Z, to the housing part 2 or 3 of the safety switch 1 provided for the stationary part Z1 of the access Z in the event of a manipulation of the safety switch 1, the two housing parts 2 and 3 are held at one another by the magnetic retaining force at the first end E1 of the first and second housing parts 2 and 3. The torque present at the second end E2 of the housing part 3 or 2 of the safety switch 1 without being installed at the frame of the access Z, however, effects a rotation of the housing part 3 or 2 with respect to the horizontal position and with respect to the housing part 2 or 3 of the safety switch 1 installed in the frame in a perpendicular position of the longitudinal axis of the housing part 3 or 2 without being installed at the frame of the access Z.

The signal transmitter 5 in the housing part 3 or 2 without being installed at the frame of the access Z hereby moves away from the signal receiver 4 of the housing part 2 or 3 installed at the stationary frame of the access Z so that a signal can no longer be received. The evaluation unit 6 therefore determines an open state of the access Z although a closed state of the access Z should be manipulated by the attachment of the housing part 3 or 2 without being installed at the frame of the access Z.

A manipulation of the safety switch 1 can thereby be excluded.

REFERENCE NUMERAL LIST 1 safety switch
2 first housing part
2a first magnetic element
3 second housing part
3a second magnetic element
4 signal receiver
5 signal transmitter
6 evaluation unit
A longitudinal axis
E1 first end
E2 second end
R automation system Z access
Z1 stationary part of the access
Z2 movable part of the access

The invention claimed is:

1. A safety switch for monitoring an access of an automation system comprising a stationary part and a movable part, wherein the safety switch has a first housing part having an elongate shape and a second housing part having a shape form-fitted with respect to the first housing part; the first housing part has a first magnetic element and the second housing part has a second magnetic element; the first housing part is arranged in a fixed position in the stationary part of the access and the second housing part is arranged in the movable part of the access such that the magnetic elements are located opposite one another in a closed state of the access, such that the magnetic elements are magnetically effective together with one another, and such that a magnetic retaining force can be measured; wherein the first housing part has a signal receiver and an evaluation unit and the second housing part has a signal transmitter, or vice versa; and the first magnetic element or the second magnetic element is provided at a first end of the elongate shape of the first or second housing part; and the signal receiver or the signal transmitter is provided at a second end of the elongate shape of the first or second housing part; and wherein the first and second housing parts are arranged in the stationary and movable parts of the access such that a longitudinal axis of the first and second housing parts is located in a horizontal position.

2. The safety switch in accordance with claim 1, wherein the first housing part has an elongate, parallelepiped shape.

3. The safety switch in accordance with claim 1, wherein the first magnetic element comprises one of an electromagnet, a permanent magnet and a magnetic armature.

4. The safety switch in accordance with claim 1, wherein the second magnetic element comprises one of a magnetic armature, an electromagnet and a permanent magnet.

5. The safety switch in accordance with claim 1, wherein the signal transmitter is arranged disposed opposite the signal receiver in the closed state of the access and the evaluation unit receives a signal in this closed position.

6. The safety switch in accordance with claim 1, wherein the signal transmitter is located spaced apart from the signal receiver in an open state of the access and the evaluation unit does not receive any signal in this open position such that the automation system can be brought into a safe state.

7. The safety switch in accordance with claim 1, wherein the magnetic holding force of the first and second magnetic elements is smaller than a torque of the elongate first and second housing parts which is formed from a weight force at the second end of the first or second housing parts respectively having the signal receiver and the evaluation unit or having the signal transmitter and a lever arm from a spacing between the second end of the first or second housing parts from the first end of the first or second housing parts respectively having the respective one of the first and second magnetic elements.

* * * * *